(12) United States Patent
Nakajima

(10) Patent No.: US 9,849,346 B2
(45) Date of Patent: Dec. 26, 2017

(54) GOLF BALL AND METHOD OF MANUFACTURE

(71) Applicant: Bridgestone Sports Co., Ltd., Tokyo (JP)

(72) Inventor: Tsuyoshi Nakajima, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 156 days.

(21) Appl. No.: 15/163,137

(22) Filed: May 24, 2016

(65) Prior Publication Data

US 2016/0375315 A1  Dec. 29, 2016

(30) Foreign Application Priority Data

Jun. 23, 2015 (JP) ................................ 2015-125323

(51) Int. Cl.
| | | |
|---|---|---|
| *A63B 37/02* | (2006.01) | |
| *B29C 44/08* | (2006.01) | |
| *A63B 37/00* | (2006.01) | |
| *B29C 44/04* | (2006.01) | |
| *B29K 9/00* | (2006.01) | |
| *B29K 105/00* | (2006.01) | |
| *B29K 105/16* | (2006.01) | |

(Continued)

(52) U.S. Cl.
CPC .......... *A63B 37/02* (2013.01); *A63B 37/0074* (2013.01); *A63B 37/0082* (2013.01); *B29C 44/0407* (2013.01); *B29C 44/08* (2013.01); *B29K 2009/00* (2013.01); *B29K 2105/0044* (2013.01); *B29K 2105/16* (2013.01); *B29K 2509/00* (2013.01); *B29K 2995/007* (2013.01); *B29K 2995/0097* (2013.01); *B29L 2009/00* (2013.01); *B29L 2031/546* (2013.01)

(58) Field of Classification Search
CPC .......... B29L 2031/546; B29L 2009/00; B29C 44/0407; B29C 44/08; B29C 44/083; B29C 44/06; A63B 37/02
See application file for complete search history.

(56) References Cited

U.S. PATENT DOCUMENTS

| | | | |
|---|---|---|---|
| 5,688,192 A | 11/1997 | Aoyama | |
| 6,180,040 B1 * | 1/2001 | Ladd | B29C 43/146 264/248 |

(Continued)

FOREIGN PATENT DOCUMENTS

| | | |
|---|---|---|
| JP | 3958833 B2 | 8/2007 |
| JP | 5166056 B2 | 3/2013 |

*Primary Examiner* — John E Simms, Jr.
(74) *Attorney, Agent, or Firm* — Sughrue Mion, PLLC

(57) ABSTRACT

In a golf ball having a core and a cover, the core is formed of a rubber composition, has center and surface portions which are unfoamed regions and has an intermediate portion containing a foamed region. The core is produced by charging the rubber composition, which contains a blowing agent, into a first curing mold and curing under given conditions, then removing the molded rubber material in a semi-cured state from the first mold, transferring the semi-cured material to a second curing mold and curing under given conditions. The foamed region of the core deforms by a certain degree at the time of impact, decreasing the radius of gyration of the ball and enabling a lower spin rate to be achieved. The decrease in resilience due to expansion of the molded material can be held to a minimum.

8 Claims, 2 Drawing Sheets

(51) Int. Cl.
  *B29K 509/00*    (2006.01)
  *B29L 9/00*      (2006.01)
  *B29L 31/54*     (2006.01)

(56) References Cited

U.S. PATENT DOCUMENTS

| | | | |
|---|---|---|---|
| 6,391,966 B1* | 5/2002 | Rajagopalan | A63B 37/0003 473/355 |
| 6,688,991 B2 | 2/2004 | Sullivan et al. | |
| 2003/0038399 A1* | 2/2003 | Scolamiero | B29C 35/0222 264/236 |
| 2003/0119989 A1* | 6/2003 | Ladd | A63B 37/0003 525/193 |
| 2007/0155542 A1* | 7/2007 | Sullivan | A63B 37/0063 473/371 |
| 2013/0072323 A1* | 3/2013 | Lin | A63B 37/0003 473/374 |

\* cited by examiner

HARDNESS PROFILE AT CORE INTERIOR

US 9,849,346 B2

GOLF BALL AND METHOD OF MANUFACTURE

CROSS-REFERENCE TO RELATED APPLICATION

This non-provisional application claims priority under 35 U.S.C. §119(a) on Patent Application No. 2015-125323 filed in Japan on Jun. 23, 2015, the entire contents of which are hereby incorporated by reference.

TECHNICAL FIELD

The present invention relates to a golf ball having a core obtained by curing a rubber composition that includes a blowing agent.

BACKGROUND ART

Rubber or resin compositions based on synthetic rubbers such as polybutadiene or on various types of thermoplastic resins have hitherto been used as golf ball materials. However, a number of golf balls have been disclosed in which some member thereof is in a foamed, or expanded, form.

For example, U.S. Pat. No. 6,688,991 discloses a golf ball having a core which contains a highly neutralized resin material that is foamed in order to control the moment of inertia of the ball. However, the resin in this art has been foamed; given that resin generally has a lower resilience than rubber and that foaming such a resin material lowers the resilience even further, the distance traveled by the golf ball is greatly reduced.

Also, J.P. No. 3,958,833 discloses art wherein a two-layer golf ball core has a center core that is made of a rubber composition containing a blowing agent. However, in this art, blowing can be carried out only in a target range within a single layer of the core. In addition, the two-layer construction of the core increases the production costs.

U.S. Pat. No. 5,688,192 discloses a golf ball having a compressible gaseous material dispersed at the interior. Also, J.P. No. 5,166,056 discloses art that includes, within a core-forming rubber composition, thermally expandable microcapsules containing a large amount of gas. However, in these disclosures, the compressible gaseous material and the thermally expandable microcapsules sometimes collapse due to the pressure applied during rubber curing, or may not properly expand, presenting difficulties during manufacture.

SUMMARY OF THE INVENTION

It is therefore an object of this invention to provide a golf ball having a core that can be foamed in a specific range using a blowing agent so as to improve and control the properties of the ball, which core can be smoothly and efficiently produced without difficulty in the course of ball manufacture. A further object of the invention is to provide a method of manufacturing such a golf ball.

As a result of extensive investigations, we have discovered that, when producing a core from a rubber composition containing a blowing agent, the foaming of a given region at the core interior can be easily carried out. Moreover, we have found that the foamed region of the core deforms to a certain degree at the time of impact and is thus able to decrease the radius of gyration of the golf ball, enabling a reduction in the spin rate to be achieved. Also, because the foamed region accounts for only part of and not all the core interior, the decrease in resilience due to foaming can be held to a minimum.

Accordingly, in a first aspect, the invention provides a golf ball having a core and a cover of one or more layer encasing the core, wherein the core is formed of a rubber composition containing a base rubber, a co-crosslinking agent, an organic peroxide and a blowing agent, has a center portion and a surface portion which are unfoamed regions, and has an intermediate portion containing a foamed region.

The blowing agent preferably has a decomposition temperature which is lower than the one-minute half-life temperature of the organic peroxide.

Typically, the foamed region is concentrically formed as a ring centered on the center of the core.

The foamed region is preferably formed to a position at a distance of 30 to 90% of the core radius from the core center as the origin.

The specific gravity of the foamed region is preferably at least 5% lower than the specific gravity of the unfoamed regions.

The material in the foamed region preferably has an average pore size of less than 500 μm.

In a second aspect, the invention provides a method of manufacturing a golf ball having a core and a cover of one or more layer encasing the core, which core is a cured and molded material produced using a first curing mold having a cavity with an inside diameter φ1 and a second curing mold having a cavity with an inside diameter φ2, such that φ1<φ2. The method includes (a) a first curing step of charging a rubber composition containing a blowing agent into the first curing mold and applying heat and pressure under given temperature and time conditions; and (b) a second curing step of removing the molded rubber material in a semi-cured state from the first curing mold following the first curing step, transferring the semi-cured material to the second curing mold and applying heat and pressure under given temperature and time conditions. The cured and molded material thus produced has a center portion and a surface portion that are unfoamed regions and has an intermediate portion containing a foamed region.

The curing time in the first curing step is preferably in the range of 33 to 60% of the sum of the curing time in the first curing step and the curing time in the second curing step.

Advantageous Effects of the Invention

In the golf ball and method of manufacture of the invention, the foamed region of the core deforms to a certain degree at the time of impact, as a result of which the ball radius of gyration becomes smaller, enabling a lower spin rate to be achieved. Also, because the foamed region of the core accounts for only part, and not all, of the core interior, the decrease in resilience due to expansion can be held to a minimum.

BRIEF DESCRIPTION OF THE DIAGRAMS

DETAILED DESCRIPTION OF THE INVENTION

Figure 1:
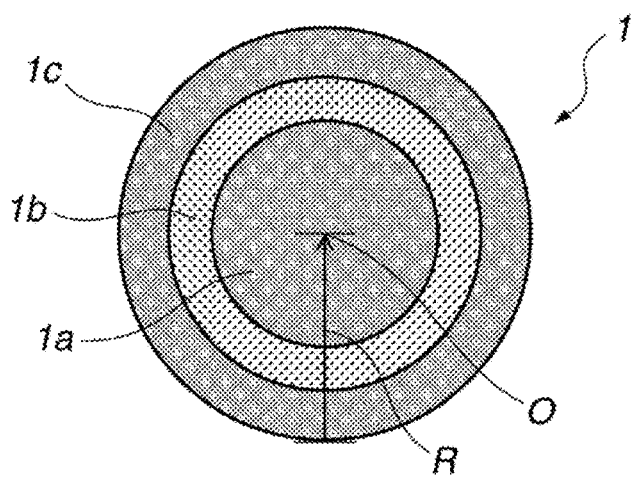
FIG. 1 is a schematic sectional diagram showing the foamed region of the core in a golf ball according to one embodiment of the invention.

The objects, features and advantages of the invention will become more apparent from the following detailed description, taken in conjunction with the foregoing diagram.

The golf ball of the invention has a core and a cover of one or more layer encasing the core. The core is composed of a foamed region and unfoamed regions.

The core is formed of a rubber composition which includes a base rubber such as polybutadiene rubber, a co-crosslinking agent and an organic peroxide.

The use of polybutadiene as the base rubber of the rubber composition is preferred. The polybutadiene is preferably one having a cis-1,4 bond content on the polymer chain of at least 80 wt %, more preferably at least 90 wt %, and even more preferably at least 95 wt %. At a content of cis-1,4 bonds among the bonds on the polybutadiene molecule which is too low, the resilience may decrease. The polybutadiene has a content of 1,2-vinyl bonds on the polymer chain of preferably not more than 2%, more preferably not more than 1.7%, and even more preferably not more than 1.5%. At a 1,2-vinyl bond content which is too high, the resilience may decrease.

To obtain a cured and molded rubber composition having a good resilience, the polybutadiene included is preferably one synthesized with a rare-earth catalyst or a group VIII metal compound catalyst. Polybutadiene synthesized with a rare-earth catalyst is especially preferred.

Rubber components other than the above polybutadiene may be included in the rubber composition, provided that doing so does not detract from the advantageous effects of the invention. Illustrative examples of rubber components other than the above polybutadiene include other polybutadienes and also other diene rubbers, such as styrene-butadiene rubber, natural rubbers, isoprene rubbers and ethylene-propylene-diene rubber.

Examples of co-crosslinking agents include unsaturated carboxylic acids and the metal salts of unsaturated carboxylic acids. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is preferably at least 5 parts by weight, more preferably at least 10 parts by weight, and even more preferably at least 15 parts by weight. The amount included is preferably not more than 60 parts by weight, more preferably not more than 50 parts by weight, and even more preferably not more than 45 parts by weight. Too much may make the core too hard, giving the ball an unpleasant feel at impact, whereas too little may lower the rebound.

The organic peroxide may be a commercially available product, specific examples of which include the following available from NOF Corporation: Percumyl® D (175.2° C.), Perhexa® 3M (149.0° C.), Perhexa® C (153.8° C.) and Perbutyl® L (159.4° C.). The numbers in parentheses indicate the one-minute half-life temperatures of the respective organic peroxides, as disclosed by the manufacturer. The use of one of these alone is preferred. The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit is preferably not more than 5 parts by weight, more preferably not more than 4 parts by weight, even more preferably not more than 3 parts by weight, and most preferably not more than 2 parts by weight. When too much or too little is included, it may not be possible to obtain a ball having a good feel, durability and rebound.

In addition to the above ingredients, an inert filler may also be included. Examples of preferred inert fillers include zinc oxide, barium sulfate and calcium carbonate. These may be used singly or as a combination of two or more thereof. The amount of inert filler included per 100 parts by weight of the base rubber is preferably at least 1 part by weight, and more preferably at least 5 parts by weight. The upper limit in the amount included is preferably not more than 100 parts by weight, more preferably not more than 80 parts by weight, and even more preferably not more than 60 parts by weight. Too much or too little inert filler may make it impossible to obtain a suitable weight and a good rebound.

In addition, an antioxidant may be optionally included. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (Yoshitomi Pharmaceutical Industries, Ltd.). These may be used singly or as a combination of two or more thereof. The amount of antioxidant included can be set to more than 0, and may be set to an amount per 100 parts by weight of the base rubber which is preferably at least 0.05 part by weight, and more preferably at least 0.1 part by weight. The maximum amount included per 100 parts by weight of the base rubber, although not particularly limited, may be set to preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a good spin rate-lowering effect on full shots.

An organosulfur compound may be optionally included in the rubber composition in order to enhance the core resilience. In cases where an organosulfur compound is included, the content thereof per 100 parts by weight of the base rubber may be set to preferably at least 0.05 part by weight, and more preferably at least 0.1 part by weight. The upper limit in the organosulfur compound content may be set to preferably not more than 5 parts by weight, more preferably not more than 4 parts by weight, and even more preferably not more than 2 parts by weight. Including too little organosulfur compound may make it impossible to obtain a sufficient core rebound-increasing effect. On the other hand, when too much is included, the core hardness may become too low, worsening the feel of the ball at impact, and the durability of the ball to cracking on repeated impact may worsen.

In this invention, by including a blowing agent in the rubber composition, a given portion of the core can be rendered into a foamed region. Examples of blowing agents that may be used include, but are not particularly limited to, the following: Cellmic A (205° C.), Cellmic C (206° C.), Cellmic CE (208° C.), Cellmic C2 (204° C.) and Cellmic S (158° C.) from Sankyo Kasei Co., Ltd.; and Cellular GX (123° C.) and Cellular D (205° C.), Vinyfon AC (208° C.) and Vinyfon FE (140° C.), and Neocellborn SB (165° C.) and Neocellborn N (160° C.) from Eiwa Chemical Ind. Co., Ltd. The numbers in parentheses indicate the decomposition temperatures of the respective blowing agents, as disclosed by the manufacturers. These may be used singly or two or more may be used together. In addition, a co-blowing agent may be added in order to adjust the decomposition temperature. For example, salicylic acid or a urea compound may be used for this purpose. Specific examples of co-blowing agents that may be used include Cellton NP (Sankyo Kasei Co., Ltd.) and Cellpaste 101 and Cellpaste K (Eiwa Chemical Ind. Co., Ltd.). It is preferable for the decomposition temperature of the blowing agent to be lower than the one-minute half-life temperature of the organic peroxide. The reason is that when the blowing agent decomposition temperature is higher than the one-minute half-life temperature of the organic peroxide, crosslinking due to the organic peroxide reaction ends up going to completion before the blowing agent decomposes, as a result of which the foamed region is not yet formed when the semi-cured material is removed from the mold after the first curing step. The blowing agent content, per 100 parts by weight of the base rubber in the rubber composition, may be set to preferably at least 0.1 part by weight, and more preferably at least 0.3 part by weight, and the upper limit may be set to preferably not more than 5 parts by weight, and more preferably not more than 4 parts by weight. When the content is too high or too low, it may not be possible to obtain a suitable foamed region, cell size and foam density.

In this invention, the rubber composition described above is cured and molded to produce the core. Production of the core can generally be carried out in the usual manner by molding the rubber composition into a spherical product (core) under heating and compression at curing conditions of at least 140° C. and not more than 180° C. for at least 10 minutes and not more than 60 minutes. A core having a foamed region and unfoamed regions can be obtained by, for example, using a first curing mold and a second curing mold in which the inside diameter ϕ1 of the first curing mold cavity has been set so as to be smaller than the inside diameter ϕ2 of the second curing mold cavity, and employing a production method that includes the first and second curing steps below.

First Curing Step: The step of charging a rubber composition containing a blowing agent into the first curing mold and applying heat and pressure under given temperature and time conditions.

Second Curing Step: The step of removing the molded rubber material in a semi-cured state from the first curing mold following the first curing step, transferring the semi-cured material to the second curing mold and applying heat and pressure under given temperature and time conditions.

The curing time in the first curing step is preferably in the range of 20 to 75%, and more preferably 33 to 60%, of the sum of the curing time in the first curing step and the curing time in the second curing step. When the rubber composition is heated, because heat travels from the surface of the spherical rubber composition to the center, by adjusting the curing time in this way, the distance reached by the temperature from the core surface toward the inside can be adjusted, thus enabling the foamed region to be set in a more preferable position.

In these curing steps, the first curing mold has a cavity inside diameter ϕ1 and the second curing mold has a cavity inside diameter ϕ2 such that ϕ1<ϕ2, thereby enabling a core composed of a foamed region and unfoamed regions to be obtained. That is, in the first curing step, the rubber composition is heated to the temperature at which the blowing agent decomposes. When the semi-cured rubber composition is removed from the first curing mold, the gas generated by decomposition of the blowing agent expands, creating a foamed region within the semi-cured rubber composition. This composition is then placed in the second curing mold and is again heated, whereupon the peroxide decomposition reaction proceeds and curing is brought to completion with a foamed region remaining within the cured and molded composition. The foamed region is often present in the form of a concentric ring about the core center. This is because, during heating of the rubber composition, heat travels from the surface of the spherical rubber composition toward the center and the region where the temperature has risen to the level at which the blowing agent decomposes becomes a foamed region due to expansion of the decomposition gases when the rubber composition is taken out of the mold. At this time, substantially no foaming has occurred on the surface side of this foamed region. The reason is that, in this surface portion, in addition to the blowing agent, the peroxide also decomposes, as a result of which crosslinking goes to completion, preventing expansion of the blowing agent decomposition gases in the surface portion even when the rubber composition is removed from the mold. Nor has foaming occurred on the center side of the foamed region, the reason being that the temperature of the rubber composition has not risen in this region and so decomposition of the blowing agent does not occur.

By including these curing steps, the golf ball manufacturing method can obtain a cured and molded material (core) which has unfoamed regions at center and surface portions thereof and includes a given foamed region at an intermediate portion thereof. Next, the foamed region and unfoamed regions at the interior of the core are described.

The inventive golf ball is characterized in that the center and surface portions of the core are unfoamed regions, and the intermediate portion of the core contains a foamed region. For example, referring to FIG. 1, the core 1 has a center portion 1a and a surface portion 1c which are unfoamed regions, and has an intermediate portion 1b separated by a given distance from the core center O where a concentric ring-like foamed region is present.

The foamed region forms to a position at a distance of 30 to 90%, preferably 40 to 80%, and more preferably 50 to 80%, of the core radius R from the core center as the origin. By thus having positions at a desired distance from the core center be a foamed region, the part of the core that undergoes the greatest deformation at the time of impact can be imparted with sufficient give, enabling the spin rate-lowering effect to be maximized. For example, when the core diameter is 36 mm, it is preferable for the foamed region to be within the range of 5.4 to 16.2 mm from the core center.

Figure 3:
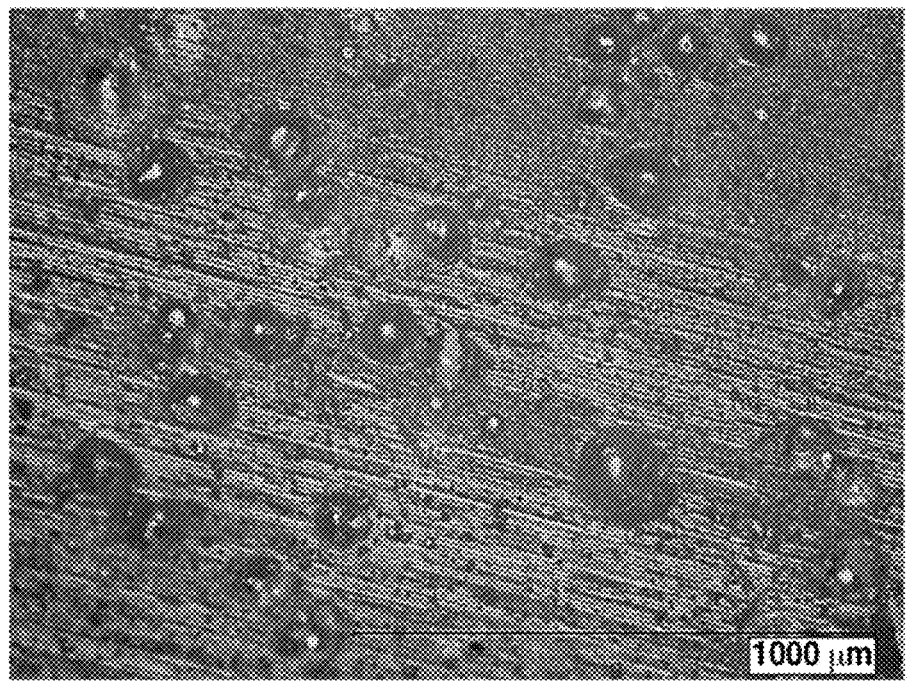
FIG. 3 is a photograph showing the foamed region (foam cells) observed under an optical microscope.

Determination of the foamed region in this invention is carried out as described below. The core is cut hemispherically and the core cross-section is examined at 1 mm intervals from the center to the surface of the core using an optical microscope. When the sum of the surface areas of foam cells within a 1 mm square region in the examined image accounts for 5% or more of the total surface area, that region is considered to be foamed. In order to carry out detailed observation, it is preferable to set the magnification to at least 100×. Use may be made of image analysis software or the like to determine the sum of the surface areas of foam cells. FIG. 3 is a photograph showing a foamed region (foam cells) observed with an optical microscope. In this photograph, the round areas are foamed areas. When the surface areas of such round areas are measured and found to be 5% or more, this region of the core is considered for the purposes of this invention to be a "foamed region."

The specific gravity of the foamed region is preferably lower than the specific gravity of the unfoamed regions. In particular, it preferable for the foamed region to have a specific gravity which is at least 5% lower than the specific gravity of the unfoamed regions. This specific gravity relationship can be regulated by suitably controlling conditions such as the curing time, curing temperature and amount of blowing agent added.

The specific gravities of the foamed region and the unfoamed regions are determined as follows. A circular disk having a thickness of 2 mm is cut from the core by passing through the geometric center thereof, the foamed region and unfoamed regions are determined in the manner described above, and a punch press is used to punch out 3 mm diameter samples of these regions. Samples are collected at three places for each region. Each sample is examined with an optical microscope and the volume is determined. At the same time, the weight of the sample is measured on an electronic scale and the actual specific gravity is calculated by dividing the weight by the volume. The specific gravities are similarly determined at all three places and the results are averaged, giving the specific gravity for that region. In cases where foaming extends over a wide range, it is preferable to collect samples near the intermediate portion of this region. Because the punched samples have a shape resembling two vertically adjoining truncated cones, the overall volume can be determined by calculating the volumes of the two truncated cones and adding them together. This is but one exemplary method for calculating the volume; use may of course be made of other methods.

The foamed region has a hardness which, compared with the internal hardness profile value measured at the same distance from the core center in a core of the same deflection that was produced without including a blowing agent, is preferably at least 1 point softer, and more preferably at least 3 points softer, on the JIS-C hardness scale. Lowering the hardness of the foamed region makes it possible to achieve the desired core hardness profile, reduce the radius of gyration owing to deformation of the foamed region, and thereby achieve a lower spin rate when the ball is hit.

The average foam cell size in the foamed region depends in part on the type of blowing agent used, but is preferably less than 500 µm. By having the average cell size of the material in the foamed region be less than 500 µm, strain at the time of impact can be uniformly dispersed, making it possible to suppress a marked decline in durability.

It is recommended that the deflection of the core, as measured by placing the core between steel plates and compressing the core under a final load of 1,275 N (130 kgf) from an initial load of 98 N (10 kgf), although not particularly limited, be preferably at least 2.5 mm, more preferably at least 2.8 mm, and even more preferably at least 3.0 mm, and that the upper limit be preferably not more than 8.0 mm, more preferably not more than 7.8 mm, and even more preferably not more than 7.5 mm.

Next, the cover used in the inventive golf ball is described. The cover is a member that encases the core and is composed of at least one layer. Exemplary covers include two-layer covers and three-layer covers. In the case of a two-layer cover, the inner layer is referred to as the intermediate layer and the outer layer is referred to as the outermost layer. In the case of a three-layer cover, the respective layers are referred to, in order from the inside: the envelope layer, the intermediate layer and the outermost layer.

Known resins may be used without particular limitation as the resin material that forms the cover. Use can be made of one, two or more resins selected from the group consisting of ionomer resins, and urethane-, amide-, ester-, olefin- and styrene-based thermoplastic elastomers. Alternatively, a resin material such as polyurethane or polyurea may be used to form the cover.

The ionomer resin is not subject to any particular limitation, and may be a known product. Commercial products that may be used as the ionomer resin include, for example, H1706, H1605, H1557, H1601, AM7329, AM7317 and AM7318, all of which are available from DuPont-Mitsui Polychemicals Co.

Thermoplastic elastomers are exemplified by polyester elastomers, polyamide elastomers and polyurethane elastomers. The use of a polyurethane elastomer is especially preferred.

The polyurethane elastomer is not particularly limited, provided it is an elastomer composed primarily of polyurethane. A morphology that includes soft segments composed of a high-molecular-weight polyol compound and hard segments composed of a diisocyanate and a monomolecular chain extender is preferred.

Exemplary polymeric polyol compounds include, but are not particularly limited to, polyester polyols and polyether polyols. From the standpoint of rebound resilience or low-temperature properties, the use of a polyether polyol is preferred. Examples of polyether polyols include polytetramethylene glycol and polypropylene glycol, with the use of polytetramethylene glycol being especially preferred. These polyether polyols have a number-average molecular weight of preferably from 1,000 to 5,000, and more preferably from 1,500 to 3,000.

Exemplary diisocyanates include, but are not particularly limited to, aromatic diisocyanates such as 4,4'-diphenylmethane diisocyanate, 2,4-toluene diisocyanate and 2,6-toluene diisocyanate; and aliphatic diisocyanates such as hexamethylene diisocyanate. In the practice of this invention, from the standpoint of reaction stability with the subsequently described isocyanate mixture when blended therewith, the use of 4,4'-diphenylmethane diisocyanate is preferred.

The monomolecular chain extender is not particularly limited, although use can be made of an ordinary polyol or polyamine. Specific examples include 1,4-butylene glycol, 1,2-ethylene glycol, 1,3-propylene glycol, 1,3-butanediol, 1,6-hexylene glycol, 2,2-dimethyl-1,3-propanediol, 1,3-butylene glycol, dicyclohexylmethylmethanediamine (hydrogenated MDA) and isophoronediamine (IPDA). These chain extenders have average molecular weights of preferably from 20 to 15,000.

A commercial product may be used as the polyurethane elastomer. Illustrative examples include Pandex T7298, TR3080, T8230, T8290, T8295 and T8260 (all available from DIC Bayer Polymer, Ltd.), and Resamine 2593 and 2597 (available from Dainichiseika Color & Chemicals Mfg, Co., Ltd.). These may be used singly, or two or more may be used in combination.

The material which forms the cover is exemplified by a resin composition containing as the essential ingredients: 100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in components (A) and (C).

Components (A) to (D) in the resin material described in, for example, JP-A 2011-120898 may be advantageously used as above components (A) to (D).

Various additives may be optionally included in the cover-forming material. For example, pigments, dispersants, antioxidants, light stabilizers, ultraviolet absorbers and internal mold lubricants may be suitably included.

A known method may be used without particular limitation as the method of forming the layers of the cover. For example, use may be made of a method in which a prefabricated core or a sphere encased by any of the various layers is placed in a mold, and the resin material prepared as described above is injection-molded over the core or layer-encased sphere. In addition, a layer of paint may be applied to the surface of the outermost layer of this cover.

Numerous dimples are typically formed on the outer surface of the cover (outermost layer) to improve the aerodynamic performance of the ball. The dimple shapes used may be of one type or a combination of two or more types selected from among circular shapes, various polygonal shapes, dewdrop shapes and oval shapes.

The golf ball of the invention can be made to conform to the Rules of Golf for play. Specifically, the inventive ball may be formed to a diameter which is such that the ball does not pass through a ring having an inner diameter of 42.672 mm and is not more than 42.80 mm, and to a weight which is preferably from 45.0 to 45.93 g.

EXAMPLES

The following Examples and Comparative Examples are provided to illustrate the invention, and are not intended to limit the scope thereof.

Examples 1 to 4, Comparative Example 1

Formation of Core

The rubber compositions shown in Table 1 were prepared, following which curing and molding were carried out at 155° C. using a first curing mold having a cavity inside diameter φ1 of 36.40 mm and a second curing mold having a cavity inside diameter φ2 of 37.10 mm for the curing times shown in Table 3 below. After cooling, the core surface was abraded in order to increase adhesion between the core and the envelope layer, thereby giving solid cores for the respective Examples of the invention and the Comparative Example.

TABLE 1

| Ingredients (pbw) | I | II |
|---|---|---|
| Polybutadiene rubber | 100 | 100 |
| Zinc oxide | 4 | 4 |
| Barium sulfate | 19.07 | 34.53 |

TABLE 1-continued

| Ingredients (pbw) | I | II |
|---|---|---|
| Antioxidant | 0.1 | 0.1 |
| Blowing agent | | 1 |
| Zinc acrylate | 36.5 | 39.25 |
| Organic peroxide | 1 | 1 |

Details on the ingredients shown in Table 1 are given below.

Polybutadiene rubber: Available under the trade name "BR 01" from JSR Corporation
Zinc oxide: Available under the trade name "Zinc Oxide Grade 3" from Sakai Chemical Co., Ltd.
Barium sulfate: Available under the trade name "Barico #100" from Hakusui Tech
Antioxidant: Available under the trade name "Nocrac NS-6" from Ouchi Shinko Chemical Industry Co., Ltd.
Blowing agent: Available under the trade name "Cellular GX" from Biwa Chemical Ind. Co., Ltd.
Zinc acrylate: Available from Nippon Shokubai Co., Ltd.
Organic peroxide: Available under the trade name "Percumyl D" from NOF Corporation Formation of Cover A multi-piece solid golf ball having a four-layer construction consisting of a core encased by, in order, an envelope layer, an intermediate layer and an outermost layer was manufactured by injection molding a three-layer cover (envelope layer, intermediate layer and outermost layer) having the properties shown in Table 2 below over the core obtained as described above. Although not shown in the diagram, dimples were formed in a specific and common pattern on the surface of the ball cover in all the Examples of the invention and in the Comparative Example.

TABLE 2

| Outermost layer | Material | Ionomer[1] |
|---|---|---|
| | Thickness | 1.28 mm |
| Intermediate layer | Material | Ionomer[2] |
| | Thickness | 1.27 mm |
| Envelope layer (layer adjoining core) | Material | Polyester elastomer[3] |
| | Thickness | 1.10 mm |

Details on the materials of the respective cover layers in the above table are given below.

1) A compound obtained by blending Himilan® 1605 and Himilan® AM7329 (DuPont-Mitsui Polychemicals Co., Ltd.) in a 1:1 ratio.
2) HPF 1000, from DuPont de Nemours & Co., Ltd.
3) Hytrel® 3046, from DuPont-Toray Co., Ltd.

Properties of the resulting golf balls, such as the thicknesses and material hardnesses of the layers and the surface hardnesses of various layer-encased spheres, were evaluated by the methods described below. In addition, the flight performance (rate of backspin on shots with a W#1 and on shots with a I#6) of each ball was evaluated by the methods described below. Those results are shown in Table 3.

Deflection of Core and Ball

A core or ball was placed between steel plates and the amount of deflection when compressed under a final load of 1,275 N (130 kgf) from an initial load of 98 N (10 kgf) was measured. The amount of deflection here refers in each case to the measured value obtained after holding the test specimen isothermally at 23.9° C.

Measured Specific Gravity

A circular disk having a thickness of 2 mm was cut from the core by passing through the geometric center thereof, and a punch press was used to punch out 3 mm diameter samples of the foamed region and the unfoamed regions of the core. Samples were collected at three places for each region. Each sample was examined with a VHX-2000 digital microscope from Keyence Corporation, and the volume was determined. At the same time, the weight of the sample was measured on an electronic scale and the actual specific gravity was calculated by dividing the weight by the volume. The specific gravities were similarly determined at all three places and the results were averaged, giving the specific gravity for that region.

Core Hardness Profile

The indenter of a durometer was set so as to be substantially perpendicular to the spherical surface of the core, and the core surface hardness on the JIS-C hardness scale was measured as specified in JIS K6301-1975.

Figure 2:
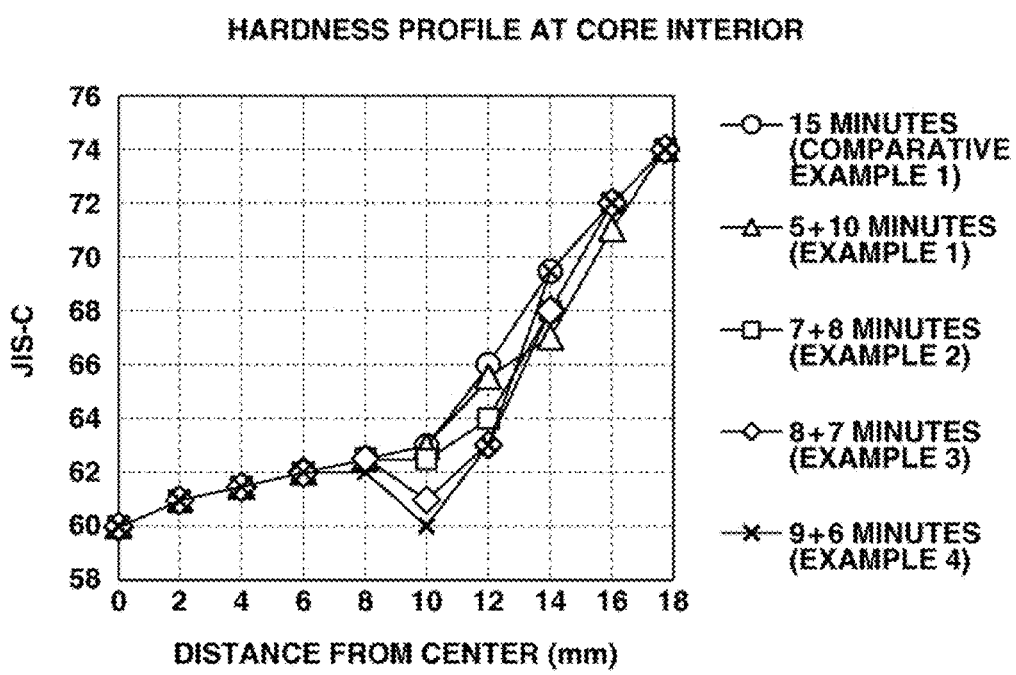
FIG. 2 is a graph showing the hardness profile at the core interior in Examples of the invention and a Comparative Example.

To obtain the cross-sectional hardnesses at the center and other specific positions of the core, the core was hemispherically cut so as form a planar cross-section, and measurements were carried out by pressing the indenter of a durometer perpendicularly against the cross-section at the measurement positions. These hardnesses are indicated as JIS-C hardness values. The core hardness profiles for the examples are shown in Table 3 and the graph in FIG. 2.

Ball Spin Rate (rpm)

The rate of backspin by the ball immediately after being struck at a head speed (HS) of 45 m/s with a driver (w#1) (TourStage ViQ (2012 model); loft angle, 11.5°; manufactured by Bridgestone Sports Co., Ltd.) mounted on a golf swing robot, and immediately after being struck at a head speed (HS) of 38 m/s with a 6 iron (I#6) (TourStage ViQ (2012 model); manufactured by Bridgestone Sports Co., Ltd.) mounted on a golf swing robot were each measured using an apparatus for measuring the initial conditions.

the intermediate portion of the core. As a result, in each of the Working Examples, the backspin rate of the golf ball on shots with a driver (W#1) or a 6 iron (I#6) was smaller than in Comparative Example 1, demonstrating that a spin rate-lowering effect on shots can be achieved.

Japanese Patent Application No. 2015-125323 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one or more layer encasing the core, wherein the core is formed of a rubber composition comprising a base rubber, a co-crosslinking agent, an organic peroxide and a blowing agent, has a center portion and a surface portion that are unfoamed regions, and has an intermediate portion containing a foamed region.

2. The golf ball of claim 1, wherein the blowing agent has a decomposition temperature which is lower than a one-minute half-life temperature of the organic peroxide.

3. The golf ball of claim 1, wherein when the core is cut hemispherically and the core cross-section is viewed from the center to the surface of the core, the foamed region is concentrically formed as a ring centered on a center of the core.

4. The golf ball of claim 1 wherein the foamed region is formed to a position centered at a distance of 30 to 90% of the core radius from a center of the core as the origin.

5. The golf ball of claim 1, wherein the foamed region and the unfoamed regions have respective specific gravities such that the specific gravity of the foamed region is at least 5% lower than the specific gravity of the unfoamed regions.

TABLE 3

|  |  | Comparative Example | Example | | | |
|---|---|---|---|---|---|---|
|  |  | 1 | 1 | 2 | 3 | 4 |
| Rubber formulation | Type No. | I | II | II | II | II |
| Curing time (min) | Step 1 | — | 5 | 7 | 8 | 9 |
|  | Step 2 | 15 | 10 | 8 | 7 | 6 |
| Core | Diameter (mm) | 35.44 | 35.43 | 35.44 | 35.42 | 35.42 |
|  | Weight (g) | 27.96 | 27.76 | 27.85 | 27.90 | 28.14 |
|  | Deflection (mm) | 4.23 | 4.35 | 4.42 | 4.26 | 4.08 |
| Range of foaming (from core center), mm |  |  | 13 to 16 | 11 to 14 | 10 to 14 | 8 to 12 |
| Specific gravity | Foamed region |  | 1.036 | 1.015 | 0.951 | 0.985 |
|  | Unfoamed regions |  | 1.124 | 1.124 | 1.123 | 1.124 |
|  | Specific gravity ratio* (%) |  | 7.8 | 9.7 | 15.3 | 12.4 |
| Hardness profile at core interior (JIS-C) | 0 mm | 60 | 60 | 60 | 60 | 60 |
|  | 2 mm | 61 | 61 | 61 | 61 | 61 |
|  | 4 mm | 62 | 62 | 62 | 62 | 62 |
|  | 6 mm | 62 | 62 | 62 | 62 | 62 |
|  | 8 mm | 63 | 63 | 63 | 63 | 62 |
|  | 10 mm | 63 | 63 | 63 | 61 | 60 |
|  | 12 mm | 66 | 66 | 64 | 63 | 63 |
|  | 14 mm | 70 | 67 | 68 | 68 | 70 |
|  | 16 mm | 72 | 71 | 72 | 72 | 72 |
|  | Surface | 74 | 74 | 74 | 74 | 74 |
| Ball deflection (mm) |  | 3.20 | 3.30 | 3.35 | 3.22 | 3.09 |
| Backspin rate (rpm) on W#1 shots |  | 3,100 | 3,080 | 3,050 | 3,060 | 3,080 |
| Backspin rate (rpm) on I#6 shots |  | 6,100 | 6,040 | 5,890 | 5,910 | 6,020 |

*Specific gravity ratio (%): [(unfoamed region − foamed region)/unfoamed region] × 100

As is apparent from Table 3, in Examples 1 to 4 of the invention, a foamed region is present at a given position in

6. The golf ball of claim 1, wherein the material in the foamed region has an average pore size of less than 500 μm.

7. A method of manufacturing a golf ball having a core and a cover of one or more layer encasing the core, which core is a cured and molded material produced using a first curing mold having a cavity with an inside diameter ø1 and a second curing mold having a cavity with an inside diameter ø2 such that ø1<ø2, the method comprising:
(a) a first curing step of charging a rubber composition containing a blowing agent into the first curing mold and applying heat and pressure under given temperature and time conditions; and
(b) a second curing step of removing the molded rubber material in a semi-cured state from the first curing mold following the first curing step, transferring the semi-cured material to the second curing mold and applying heat and pressure under given temperature and time conditions,
wherein the cured and molded material has a center portion and a surface portion that are unfoamed regions and has an intermediate portion containing a foamed region.

8. The manufacturing method of claim 7, wherein the curing time in the first curing step is in the range of 33 to 60% of the sum of the curing time in the first curing step and the curing time in the second curing step.

* * * * *